United States Patent
Boersma et al.

(10) Patent No.: US 10,831,496 B2
(45) Date of Patent: Nov. 10, 2020

(54) METHOD TO EXECUTE SUCCESSIVE DEPENDENT INSTRUCTIONS FROM AN INSTRUCTION STREAM IN A PROCESSOR

(71) Applicant: INTERNATIONAL BUSINESS MACHINES CORPORATION, Armonk, NY (US)

(72) Inventors: Maarten J. Boersma, Holzgerlingen (DE); Michael Klaus Kroener, Ehningen (DE); Niels Fricke, Herrenberg (DE); Razvan Peter Figuli, Remchingen (DE); Nandor Szirmak, Böblingen (DE); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/288,644

(22) Filed: Feb. 28, 2019

(65) Prior Publication Data
US 2020/0278868 A1   Sep. 3, 2020

(51) Int. Cl.
*G06F 9/38*   (2018.01)
*G06F 9/30*   (2018.01)

(52) U.S. Cl.
CPC ........ *G06F 9/3824* (2013.01); *G06F 9/30101* (2013.01); *G06F 9/382* (2013.01); *G06F 9/3802* (2013.01)

(58) Field of Classification Search
CPC .... G06F 9/3824; G06F 9/30101; G06F 9/382; G06F 9/3802
See application file for complete search history.

(56) References Cited

U.S. PATENT DOCUMENTS

| | | | | |
|---|---|---|---|---|
| 5,802,386 A | * | 9/1998 | Kahle | G06F 9/3836 712/215 |
| 6,263,424 B1 | * | 7/2001 | Tran | G06F 9/3001 708/706 |
| 6,748,590 B1 | * | 6/2004 | Martin | G06F 7/523 708/627 |
| 6,889,318 B1 | | 5/2005 | Wichman | |
| 7,051,190 B2 | | 5/2006 | Samra | |
| 7,458,069 B2 | | 11/2008 | Ronen | |
| 2002/0010851 A1 | * | 1/2002 | Morris | G06F 9/3861 712/244 |

(Continued)

OTHER PUBLICATIONS

Lu, et al, "Instruction Fusion for Multiscalar and Many-Core Processors", International Journal of Parallel Programming, [published online Sep. 30, 2015], 13 pages, DOI 10.1007/s10766-015-0386-1.

*Primary Examiner* — Farley Abad
(74) *Attorney, Agent, or Firm* — Erik K. Johnson

(57) ABSTRACT

The present disclosure relates to a method to execute successive dependent instructions from an instruction stream in a processor. In an embodiment, the invention relates to a method to execute successive dependent instructions from an instruction stream in a processor. The method may include identifying a first instruction and a second instruction. A given operand of a second instruction is an output of the first instruction of the pair. The first instruction is older than the second instruction. The method may include loading the operands of the first instruction and the second instruction. The method may include executing the first instruction and the second instruction.

20 Claims, 4 Drawing Sheets

(56) References Cited

U.S. PATENT DOCUMENTS

| | | |
|---|---|---|
| 2004/0034757 A1 | 2/2004 | Gochman |
| 2008/0250226 A1* | 10/2008 | Eickemeyer .......... G06F 9/3838 712/20 |
| 2011/0087895 A1* | 4/2011 | Olson ................... G06F 9/3885 713/190 |
| 2014/0281397 A1 | 9/2014 | Loktyukhin |
| 2016/0170751 A1* | 6/2016 | Col ....................... G06F 9/3834 712/217 |
| 2016/0179542 A1 | 6/2016 | Lai |
| 2017/0003965 A1 | 1/2017 | Ouziel |
| 2018/0032341 A1 | 2/2018 | Henry |
| 2018/0336165 A1* | 11/2018 | Phelps ..................... G06N 3/02 |

* cited by examiner

201 — identifying a pair of successive dependent instructions
203 — loading the operands of the two instructions excluding the given operand in one or more processor cycles of a single instruction cycle
205 — executing the first instruction and the second instruction
Fig. 3
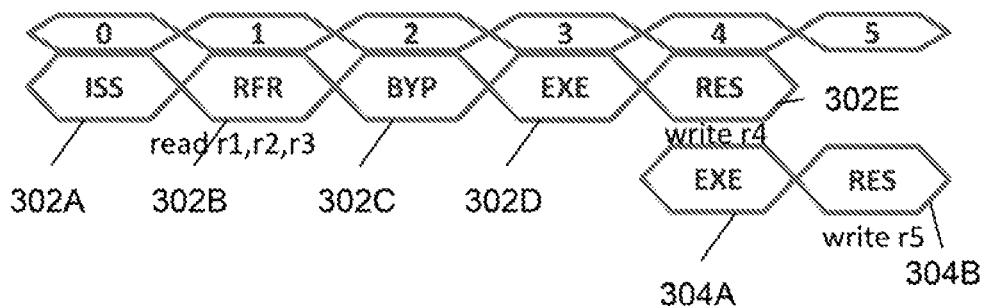
Fig. 4A
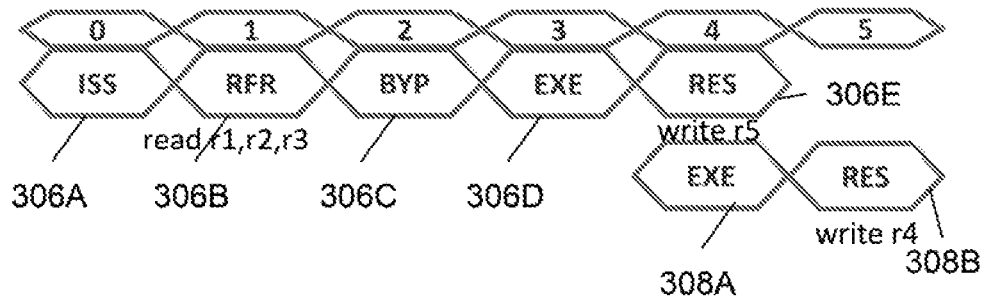
Fig. 4B

METHOD TO EXECUTE SUCCESSIVE DEPENDENT INSTRUCTIONS FROM AN INSTRUCTION STREAM IN A PROCESSOR

BACKGROUND

The present invention relates to the field of digital computer systems, and more specifically, to a method to execute successive dependent instructions from an instruction stream in a processor.

In current designs, execution units have a single output bus due to wire congestion. The allocation of two output results of a fused instruction needs to be done in consecutive cycles.

SUMMARY

Various embodiments provide a method to execute successive dependent instructions from an instruction stream in a processor, processor system as described by the subject matter of the independent claims. Advantageous embodiments are described in the dependent claims. Embodiments of the present invention can be freely combined with each other if they are not mutually exclusive.

In an embodiment, the invention relates to a method to execute successive dependent instructions from an instruction stream in a processor. The method may include identifying a first instruction and a second instruction. A given operand of a second instruction is an output of the first instruction of the pair. The first instruction is older than the second instruction. The method may include loading the operands of the first instruction and the second instruction. The method may include executing the first instruction and the second instruction.

BRIEF DESCRIPTION OF THE SEVERAL VIEWS OF THE DRAWINGS

In the following embodiments the invention is explained in greater detail, by way of example only, making reference to the drawings in which:

FIG. 3 depicts a flowchart of to execute successive dependent instructions from an instruction stream in a processor according to an embodiment of the present invention.

FIG. 4A depicts two instruction cycles according to an embodiment of the present invention.

FIG. 4B depicts two instruction cycles according to an embodiment of the present invention.

DETAILED DESCRIPTION

Figure 1:
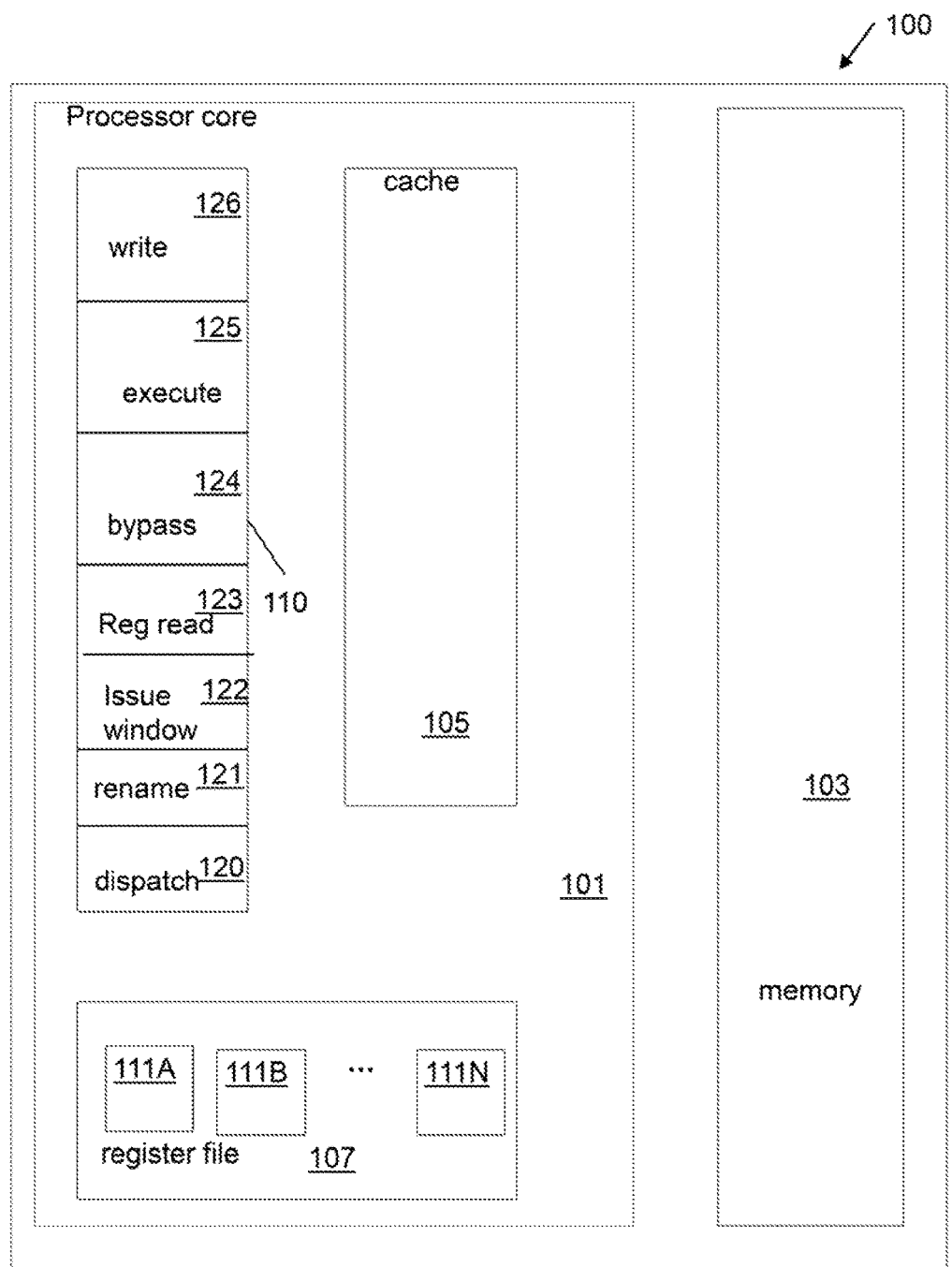
FIG. 1 depicts an example multiprocessor system in accordance with the present disclosure according to an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The present disclosure may speed up the execution of dependent instructions. This may particularly be advantageous as the present method may be implemented in an existing processor with minimal reconfigurations. By performing the loading in a single instruction cycle, the number of read accesses may be reduced (e.g. because there may be no need to read the given operand in a read access step). This may save power in the processor.

The instruction cycle refers to an operational process of a computer system of different steps. The instruction cycle may for example be the process by which a computer retrieves a program instruction from its memory, determines what actions the instruction describes, and then carries out those actions. Each step of the instruction cycle may be performed in a processor clock cycle. The processor cycle refers to the processor clock cycle.

The following embodiments provide methods for performing the steps of executing the first and second instructions. These methods may improve the execution process of dependent instructions with regard to conventional methods, by limiting the time needed to supply results of instructions to instructions that are dependent on them. This may improve the speed that overall results may be calculated.

According to one embodiment, the executing of the first and second instructions is performed in respective processor cycles of two distinct instruction cycles, wherein one of the two distinct instruction cycles is the instruction cycle used for the loading.

According to one embodiment, the execution of the first instruction and the second instruction comprises: executing the first instruction in a first processor cycle; providing the result of the execution of the first instruction in a second processor cycle; using the result of the first instruction for executing the second instruction during the second processor cycle; and providing the result of the second instruction in a third processor cycle.

According to one embodiment, the execution of the first instruction and the second instruction comprises: executing the second instruction in a first processor cycle; providing the result of the execution of the second instruction in a second processor cycle; executing the first instruction during the second processor cycle; and providing the result of the first instruction in a third processor cycle. This method may be performed using a processing unit that is configured to receive as input the loaded operands. For example, in case of dependent add instructions (e.g. first add r4 r1 r2 and second add r5 r4 r3), the execution of the second instruction before the first instruction may be performed by employing an ALU that supports 3 operands. This means r1+r2+r3 can be computed by a single instruction, and there is no need to wait for r1+r2.

According to one embodiment, the method further comprises storing the result of the second instruction in a first processing cycle before storing the result of the first instruction in a second processor cycle. This may particularly be advantageous in case of a third instruction is dependent on the result of the second instruction. This may further speed up the execution process of the processor.

According to one embodiment, the method further comprises storing the result of the first instruction in a first processor cycle before storing the result of the second instruction in a second processor cycle. This may particularly be advantageous in case of a third instruction is dependent on the result of the first instruction. This may further speed up the execution process of the processor.

According to one embodiment, the method further comprises invoking an instruction dependent on the result of the second instruction in a third processor cycle and invoking another instruction dependent on the result of the first instruction in a subsequent processor cycle.

According to one embodiment, the method further comprises invoking an instruction dependent on the result of the first instruction in a third processor cycle and invoking another instruction dependent on the result of the second instruction in a subsequent processor cycle.

According to one embodiment, the method further comprises: before executing the first and second instructions determining whether a third instruction is dependent on the first instruction or dependent on the second instruction; in case the third instruction is dependent on the first instruction switching into a first operation mode; in case the third instruction is dependent on the second instruction switching into a second operation mode; wherein in the first operation mode the method further comprises: storing the result of the first instruction in a first processor cycle before storing the result of the second instruction in a second processor cycle; wherein in the second operation mode the method further comprises: storing the result of the second instruction in a first processing cycle before storing the result of the first instruction in a second processor cycle. Determining whether a third instruction is dependent on the first instruction or dependent on the second instruction may be predicted or anticipated by, for example, learning from past executions. This may allow to issue the first two instructions as soon as they are fetched and decoded, without needing to wait on fetching also the dependent third instruction. In another example, determining whether a third instruction is dependent on the first instruction or dependent on the second instruction may be based on an assumption that in average the third dependent instruction would rather depend on the second result than on the first result or vice versa. This may depend on the workload and thus a programmer input would be beneficial to select between regular and reversed result order based on the application.

For example, the processor may run in a default or normal mode of operation before performing the switching to the first operation mode or to the second operation mode. The method may further comprise switching back to the first operation mode after the storing of the results of the first and second instructions.

The operation mode may be changed using a software control (e.g. a program sends hint, e.g. a Move-To-SPR instruction. Move-To-SPR may be an instruction for copying the contents of a general-purpose register into a special-purpose register) or a hardware control (e.g. an implementation of a dynamic feedback from a dispatcher or issue queue).

According to one embodiment, the dependent instructions are different types of instructions.

According to one embodiment, at least one of the dependent instructions is an add instruction. For example, the first and second instructions may be add instructions. In another example, the dependent instructions may comprise a multiply instruction followed by an add instruction. E.g. the first instruction may be mul r4, r1, r2 and the second instruction may be add r5, r4, r3. These two instructions may be combined and executed as follows: mul r4, r1, r2, madd r5, r1, r2, r3 in any order.

FIG. 1 shows an example processor system 100 in accordance with the present disclosure. The processor system 100 comprises at least one processor core (or processor) 101. The processor system 100 further comprises a main memory 103.

The processor core 101 may comprise a cache 105 associated with the processor core 101. The cache 105 is employed to buffer memory data in order to improve processor performance. The cache 105 is a high-speed buffer holding cache lines of memory data that are likely to be used e.g. cache 105 is configured to cache data of the main memory 105. Typical cache lines are 64, 128 or 256 bytes of memory data.

The processor core 101 may comprise an instruction execution pipeline 110. The execution pipeline 110 may include multiple pipeline stages, where each stage includes logic circuitry fabricated to perform operations of a specific stage in a multi-stage process needed to fully execute an instruction. Execution pipeline 110 may include a dispatch unit 120.

The dispatch unit 120 may be configured to fetch an instruction of the pipeline 110 and to decode the fetched instruction. Following the instruction fetch and decode, register operands of the instruction are renamed by rename unit 121. The renamed instruction may then be deposited in an issue window 122, where the instruction waits for its source operands and an appropriate functional unit to become available. The issue window 122 comprises a window logic which is responsible for monitoring dependencies between instructions in the window and issuing instructions to the functional units. The window logic includes a wakeup logic and select logic. The wakeup logic is responsible for "waking up" (invoking) instructions waiting in the issue window when their source operands become available. Once an instruction is issued for execution, a tag corresponding to its result is broadcast to all the instructions in the window. Each instruction in the window compares the tag with its source operand tags. Once all the source operands of an instruction are available the instruction is flagged ready for execution. The select logic is responsible for selecting instructions for execution from the pool of ready instructions. An instruction is said to be ready if all of its source operands are available. The operand values of the instruction are either fetched from a register file 107 by the register read unit 123 of the execution pipeline 110 or are bypassed from earlier instructions in the pipeline. In another example, one of the operands may be provided as immediate value embedded in a special field of the instruction word. The instruction is then issued and executes on one of the functional units of execution unit 125 of the execution pipeline 110 and results are bypassed from outputs to inputs by bypass unit 124 of the execution pipeline 110. Results of the execution may be stored either in memory 103, registers 111A-N or in other machine hardware (such as control registers) by the write unit 126.

The processor core 101 may further comprise the register file 107 comprising registers 111A-111N associated with the processor core 101. The registers 111A-N may for example be general purpose registers that each may include a certain number of bits to store data items processed by instructions executed in pipeline 110.

The source code of a program may be compiled into a series of machine-executable instructions defined in an instruction set architecture (ISA) associated with processor core 101. When processor core 101 starts to execute the executable instructions, these machine-executable instructions may be placed on pipeline 110 to be executed sequentially.

The instructions of the ISA may be provided to process data items stored in memory 103 and/or in registers 111A-N. For example, an instruction may retrieve a data item from the memory 103 to a register 111A-N. Rename unit 121 may retrieve data items to be processed from registers 111A-N. Execution unit 123 may include logic circuitry to execute instructions specified in the ISA of processor core 101. After execution of an instruction to process data items retrieved by rename unit 121, write unit 124 may output and store the results in registers 111A-N.

Figure 2:
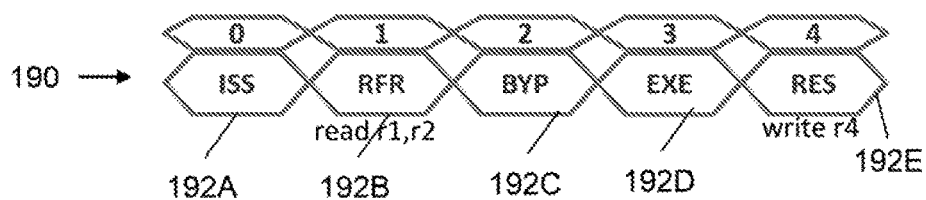
FIG. 2 depicts one instruction cycle according to an embodiment of the present invention.

FIG. 2 further shows an example instruction cycle 190 for an add instruction for adding values of operands r1 and r2 e.g. Add r4, r1, r2. The instruction cycle 190 comprises multiple processor cycles 192A-192E. For example, the issue of the instruction may be performed in the processor cycle 192A and the writing of the results may be performed in the processor cycle 192E.

FIG. 3 is a flowchart of a method to execute successive dependent instructions from an instruction stream in a processor e.g. 101.

In step 201, a pair of successive dependent instructions may be identified. A given operand of a second instruction of the pair is an output of the first instruction of the pair. The second instruction may be the younger instruction of the pair and the first instruction may be the older instruction of the pair.

In step 203, the operands of the two instructions excluding the given operand may be loaded in one or more processor cycles of a single instruction cycle.

In step 205, the first instruction and the second instruction may be executed.

FIGS. 4A-4B are diagrams illustrating examples of executing two dependent add instructions in accordance with the present disclosure.

For example, the first add instruction may add the values of registers r1 and r2, and the result may be stored in register r4: add r4, r1, r2. The second add instruction may add the values of registers r4 and r3, and the result may be stored in register r5: add r5, r4, r3. The two add instructions are dependent as the second instruction would use the result r4 for computing the sum of r5. As described above with reference to FIG. 1, the instruction cycle for executing an add instruction comprises five processor cycles.

FIG. 4A shows two instruction cycles. The first instruction cycle comprising processor cycles 302A-E may be used for execution of the first instruction. The second instruction cycle comprising processor cycles 302A-C and 304A-B may be used to execute the second instruction.

The three first processor cycles 302A-C of the first instruction cycle are used for both add instructions. That is, the three first processing cycles 302A-C are used to load the operands r1, r2 and r3 of the two instructions e.g. instead of loading only the operands of the first instruction in the cycles 302A-C, the operands r1, r2 and r3 of the two instructions are loaded. The first instruction is then executed in the processor cycle 302D and the result of the execution is written in processor cycle 302E. In parallel to writing the result of the first instruction in the processor cycle 302D, the second instruction is executed in the processor cycle 304A and the result of the execution of the second instruction is written in the processor cycle 304B. In this way, the result of the second instruction is available five cycles after first issue (302A). In addition, since only 3 register file read accesses (instead of four readings of four operands) are performed this may enable power saving.

FIG. 4B shows two instruction cycles. The first instruction cycle comprising processor cycles 306A-C, 308A-B may be used to execute the first instruction. The second instruction cycle comprising processor cycles 306A-E may be used for execution of the second instruction.

The three first processing cycles 306A-C of the first instruction cycle are used for both add instructions. That is, the three first processing cycles 306A-C are used to load the operands r1, r2 and r3 of the two instructions e.g. instead of loading only the operands of the first instruction in the cycles 306A-C, the operands r1, r2 and r3 of the two instructions are loaded. The second instruction is then executed in the processor cycle 306D and the result of the second instruction is written in the processor cycle 306E of the second instruction cycle. In parallel to writing the result of the second instruction in the processor cycle 306E, the first instruction is executed in processor cycle 308A of the first instruction cycle. The result of the execution of the first instruction is written in processor cycle 308B of the first instruction cycle. In this way, the result of the second instruction is available four cycles after first issue (306A). In addition, since only 3 register file read accesses (instead of four readings of four operands) are performed this may enable power saving. FIG. 3B provides an example where the second instruction is executed before the first instruction. The execution of the second instruction before the first instruction may be performed by employing a 3-input ALU that supports 3 operands. This means, the sum r1+r2+r3 can be computed by a single instruction, and thus there may be no need to wait for the result of execution of the sum r1+r2 of the first instruction. Thus, r1+r2+r3 is first computed and then r1+r2, and the writing of the results is performed in the same order as the execution while not needing to further artificially delay any of the two results.

The methods of FIGS. 4A and 4B may speed up the execution process of the two add instructions. As described with reference to FIGS. 4A and 4B, the result of the executions of the second instruction can be provided before or after the provision of the result of the execution the first instruction. This may have another advantage as described with reference to FIG. 4 in that further instructions may be invoked or waked-up based on which result of the two instructions is first written.

Figure 5A:
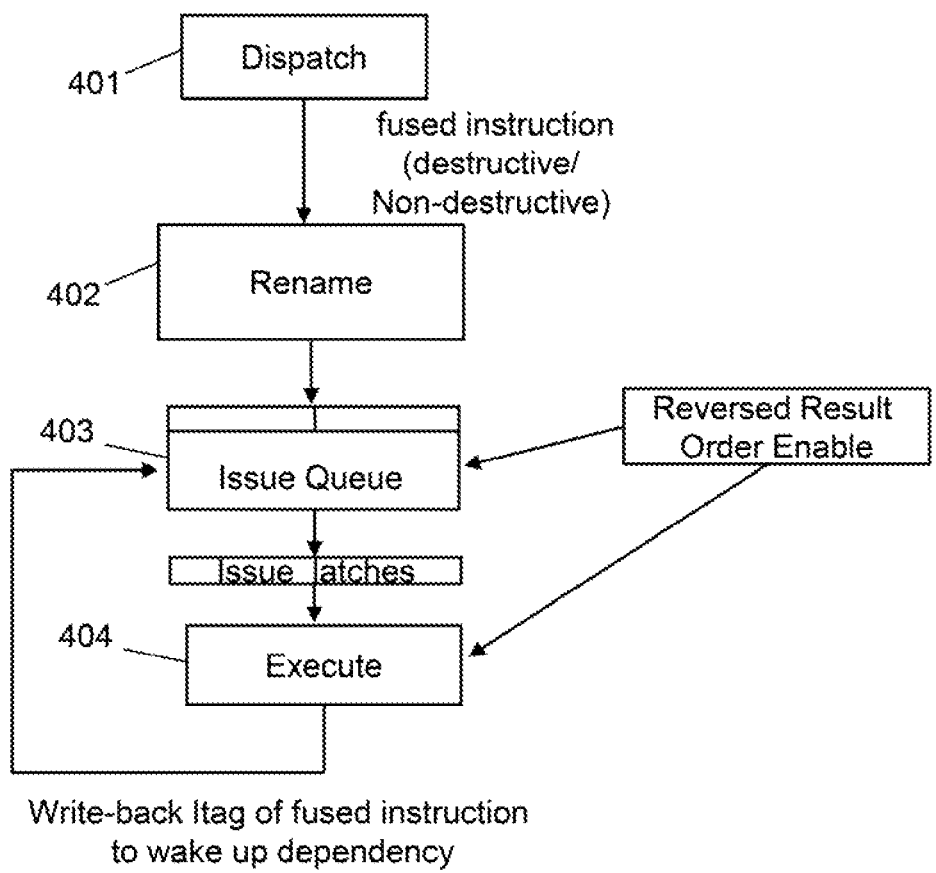
FIG. 5A depicts a diagram illustrating a method for executing an instruction stream comprising two add instructions according to an embodiment of the present invention.

FIG. 5A is a diagram illustrating a method for executing an instruction stream comprising two add instructions such as the first and second add instructions described with reference to FIGS. 4A and 4B.

Since the two add instructions are dependent instructions their combination may be referred to as fused instruction. The fused instruction may be a destructive fusion type instruction or a non-destructive fusion type instruction. The fused instruction may be a destructive fusion type instruction if the result of the first add instruction is not stored. The fused instruction may be a non-destructive fused type instruction if the result of the first add instruction is to be stored. The result of the fused destructive instruction may be the result of the second instruction e.g. r5. And the result of the fused non-destructive instruction may be the result of the first instruction r4 and the result of the second instruction e.g. r5.

The fused instruction may be associated with two destination instruction tags, ITAGs to update two registers, namely ITAG0 which is a destination ITAG of the older part (first instruction) of the fused instruction and ITAG1 which is a destination ITAG of the younger part (second instruction) of the fused instruction.

At dispatch unit (e.g. 120), the fused instruction may be decoded and it may be detected whether the fused instruction is a destructive or non-destructive fusion type instruction in step 401.

The information regarding the fusion type may be passed in step 402 to an issue queue such as issue window 122. At issue time, issue queue may inform in step 403 an execution unit (e.g. 125) whether the fused instruction is a destructive or non-destructive type instruction. For example, the issue queue may issue both destination ITAGs to the execution unit, in instances where it is non-destructive.

In step 404, the execution unit may perform the following.

If the fused instruction is a destructive type instruction, the result (e.g. r5) is written back in a first processor cycle. For example, a vector and scalar unit (VSU) of the processor may set a bit WB_ITAG0_valid=0, and bit WB_ITAG1_valid=1 to allow only the younger part of the fused instruction to be written back first.

If the fused instruction is a non-destructive type, the result (e.g. r4 and r5) is written back in two consecutive processor cycles. The writing of the result in two consecutive processor cycles may be performed in accordance with two modes.

If a mode of operation named "Reversed Result Order Enabled" mode (the second operation mode described herein) is enabled, the younger result r5 will be written back first in a first processor cycle (cycle 1) to speed up the dependency wake up of instructions. The older result r4 will be written back in the next processor cycle (cycle 2). In this case, the issue queue will wake up instructions that are dependent on the younger result first, and wake up instructions that are dependent on the older result in the next cycle. The Execution unit will finish the fused instruction when both results are written back. The writing of the results may be performed using the VSU as follows. In cycle 1, the VSU may perform a 3-way operation (i.e. add) on the fused instruction. The VSU may send back write back data along with its associated ITAG1 of the younger part of the fused instruction to the issue queue to wake up the next dependency in the stream. In cycle 2, the VSU may perform a 2-way operation (i.e. add) on the fused instruction. It will send back ITAG0 of the older part of the fused instruction to the issue queue for dependency wake up.

If another mode named "Reversed Result Order Disabled" mode, the result of the second instruction is written in cycle 2 and the result of the first instruction is written in cycle 1.

Figure 5B:
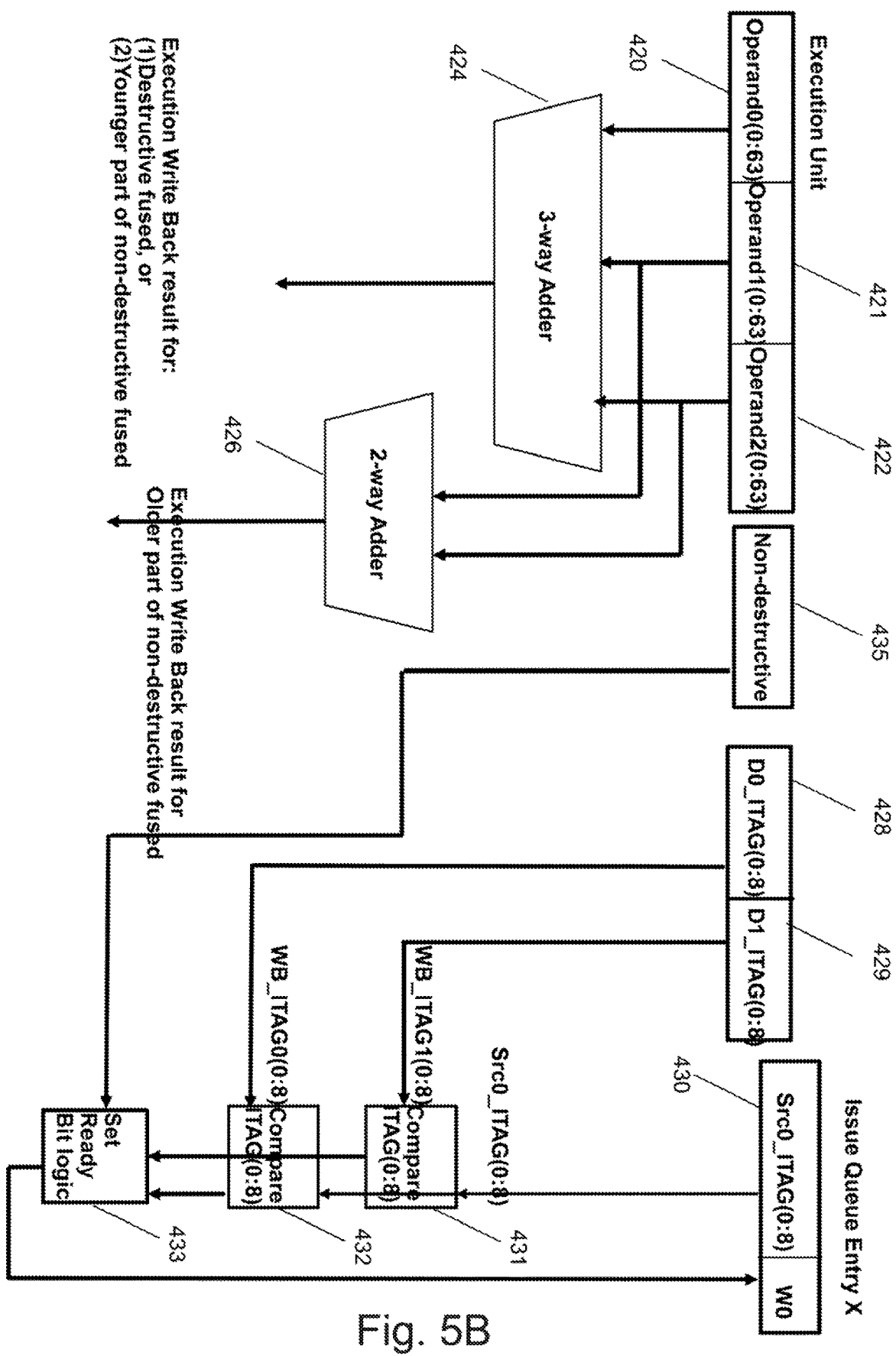
FIG. 5B depicts an example logic circuitry that enables to perform a "Reversed Result Order Enabled" mode of operation according to an embodiment of the present invention.

FIG. 5B shows an example logic circuitry that enables to perform the "Reversed Result Order Enabled" mode of operation.

For the destructive fusion type, the two add instructions may be defined as follows: Add R4, R1, R2 (older instruction) and Add R5, R4, R3 (younger instruction). The fused instruction may be defined as follows: Add R5, R1, R2, R3. The fused instruction may only need to write back the final result to R5 after the fused instruction is executed (1 cycle write back).

For the non-destructive fusion type the two instructions may be defined as follows: Add R4, R1, R2 (older instruction) and Add R5, R4, R3 (younger instruction). The fused instruction may be defined as Add R4/R5, R1, R2, R3. In this case, the VSU may take two cycles to write back both R4 and R5. In cycle 1 the result R5 of the execution of the instruction Add R5, R1, R2, R3 may be written back. In cycle 2 the result R4 of the execution of the instruction Add R4, R1, R2 may be written back.

For the destructive fusion type, the fused instruction may be executed using a 3-way adder 424 that has as inputs operands 420, 421 and 422. For example, operand 420 has value of R3. Operand 421 has value of R1 and operand 422 has value of R2.

For the non-destructive fusion type, the fused instruction may be executed using 3-way adder 424 and 2-way adder 426. The two-way adder 426 has as inputs operands 421 and 422. The 3-way adder 424 is used to compute the result of the second instruction (younger instruction) and the 2-way adder is used to compute the result of the first instruction (older instruction). In another example, the non-destructive fused instruction may be executed using the same 3-way adder for both instructions in consecutive cycles. This may be done using the pipelining and by using three operands for the first instruction wherein one of the three operands is set to 0, i.e. the two-way (add r4, r1, r2) can be substituted by a three-way (add r4, r1, r2, 0). This may save area and power as it may eliminate the need to have two distinct adder units.

Two destination ITAGs 428 and 429 are associated with the first and second instructions of the fused instruction respectively. And a source ITAG 430 may be used to compare its value with the values of the destination ITAGs 428 and 429. The comparison involving the ITAG 429 is performed at the compare logic 431. The comparison involving the ITAG 428 is performed at the compare logic 432. The result of the compare logics 431-432 is used to set a ready bit 433 as follows. If the comparison matches ITAG 429 (of younger part of the fused instruction) and if the fused instruction is a non-destructive fused instruction, then the ready bit may be set for this cycle. If the comparison matches ITAG 428 (of older part of the fused instruction), and if the fused instruction is a non-destructive fused instruction, the ready bit may be set next cycle. Information regarding whether the fused instruction is a non-destructive instruction, may be stored in a register 435.

If either comparison of the two compare logics matched, and if the fused instruction is a destructive fused instruction, the ready bit may be set this cycle.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method to execute successive dependent instructions from an instruction stream in a processor, the method comprising:
   identifying a first instruction and a second instruction, wherein a given operand of a second instruction is an output of the first instruction of the pair, and wherein the first instruction is older than the second instruction;
   loading the operands of the first instruction and the second instruction;
   prior to executing the first instruction and second instruction, determining whether a third instruction is dependent on the first instruction or dependent on the second instruction;
   storing the result of an instruction depended on by the third instruction in a first processor cycle and the result of an instruction not depended on by the third instruction in a second processor cycle; and
   executing the first instruction and the second instruction.

2. The method of claim 1, wherein the executing of the first and second instructions is performed in respective processor cycles of two distinct instruction cycles, wherein one of the two distinct instruction cycles is the instruction cycle used for the loading.

3. The method of claim 1, wherein the execution of the first instruction and the second instruction comprises: executing the first instruction in a first processor cycle; providing the result of the execution of the first instruction in a second processor cycle; using the result of the first instruction for executing the second instruction during the second processor cycle; and providing the result of the second instruction in a third processor cycle.

4. The method of claim 3, further comprising invoking an instruction dependent on the result of the first instruction in the third processor cycle and invoking another instruction dependent on the result of the second instruction in a subsequent processor cycle.

5. The method of claim 1, wherein the execution of the first instruction and the second instruction comprises: executing the second instruction in a first processor cycle; providing the result of the execution of the second instruction in a second processor cycle; executing the first instruction during the second processor cycle; and providing the result of the first instruction in a third processor cycle.

6. The method of claim 5, being performed using a processing unit that is configured to receive as input the loaded operands.

7. The method of claim 5, further comprising invoking an instruction dependent on the result of the second instruction in the third processor cycle and invoking another instruction dependent on the result of the first instruction in a subsequent processor cycle.

8. The method of claim 1, further comprising storing the result of the second instruction in a first processing cycle before storing the result of the first instruction in a second processor cycle.

9. The method of claim 1, further comprising storing the result of the first instruction in a first processor cycle before storing the result of the second instruction in a second processor cycle.

10. The method of claim 1, further comprising:
based on determining the third instruction is dependent on the first instruction, switching into a first operation mode, wherein in the first operation mode comprises storing the result of the first instruction in a first processor cycle before storing the result of the second instruction in a second processor cycle.

11. The method of claim 1, further comprising:
based on determining the third instruction is dependent on the second instruction switching into a second operation mode, wherein in the second operation mode comprises storing the result of the second instruction in a first processing cycle before storing the result of the first instruction in a second processor cycle.

12. The method of claim 1, wherein the dependent instructions are different types of instructions.

13. A computer program product for execute successive dependent instructions from an instruction stream in a processor, the computer program product comprising:
one or more computer-readable storage devices and program instructions stored on at least one of the one or more tangible storage devices, the program instructions comprising:
identifying a first instruction and a second instruction, wherein a given operand of a second instruction is an output of the first instruction of the pair, and wherein the first instruction is older than the second instruction;
loading the operands of the first instruction and the second instruction;
prior to executing the first instruction and second instruction, determining whether a third instruction is dependent on the first instruction or dependent on the second instruction;
storing the result of an instruction depended on by the third instruction in a first processor cycle and the result of an instruction not depended on by the third instruction in a second processor cycle; and
executing the first instruction and the second instruction.

14. The computer program product of claim 13, wherein the execution of the first instruction and the second instruction comprises: executing the second instruction in a first processor cycle; providing the result of the execution of the second instruction in a second processor cycle; executing the first instruction during the second processor cycle; and providing the result of the first instruction in a third processor cycle.

15. The computer program product of claim 13, further comprising:
based on determining the third instruction is dependent on the first instruction, switching into a first operation mode, wherein in the first operation mode comprises storing the result of the first instruction in a first processor cycle before storing the result of the second instruction in a second processor cycle.

16. The computer program product of claim 13, further comprising:
based on determining the third instruction is dependent on the second instruction switching into a second operation mode, wherein in the second operation mode comprises storing the result of the second instruction in a first processing cycle before storing the result of the first instruction in a second processor cycle.

17. A computer system for execute successive dependent instructions from an instruction stream in a processor, the computer system comprising:
one or more processors, one or more computer-readable memories, one or more computer-readable storage devices, and program instructions stored on at least one of the one or more computer-readable devices for execution by at least one of the one or more processors via at least one of the one or more memories, the program instructions comprising:
identifying a first instruction and a second instruction, wherein a given operand of a second instruction is an output of the first instruction of the pair, and wherein the first instruction is older than the second instruction;
loading the operands of the first instruction and the second instruction;
prior to executing the first instruction and second instruction, determining whether a third instruction is dependent on the first instruction or dependent on the second instruction;
storing the result of an instruction depended on by the third instruction in a first processor cycle and the result of an instruction not depended on by the third instruction in a second processor cycle; storing the result of an instruction depended on by the third instruction in a first processor cycle and the result of an instruction not depended on by the third instruction in a second processor cycle; and
executing the first instruction and the second instruction.

18. The computer system of claim 17, wherein the execution of the first instruction and the second instruction comprises: executing the second instruction in a first processor cycle; providing the result of the execution of the second instruction in a second processor cycle; executing the first instruction during the second processor cycle; and providing the result of the first instruction in a third processor cycle.

19. The computer system of claim 17, further comprising:
based on determining the third instruction is dependent on the first instruction, switching into a first operation mode, wherein in the first operation mode comprises storing the result of the first instruction in a first processor cycle before storing the result of the second instruction in a second processor cycle.

20. The computer system of claim 17, further comprising:
based on determining the third instruction is dependent on the second instruction switching into a second operation mode, wherein in the second operation mode comprises storing the result of the second instruction in a first processing cycle before storing the result of the first instruction in a second processor cycle.

* * * * *